United States Patent
Schuller et al.

(10) Patent No.: US 8,521,583 B2
(45) Date of Patent: Aug. 27, 2013

(54) COMPUTERIZED MANAGEMENT SYSTEM FOR MULTI-CHAIN PROMOTIONS, AND RELATED AUDIT SYSTEM

(75) Inventors: Robert J. Schuller, Troy, OH (US); Robert J. Weisz, Aurora (CA)

(73) Assignee: Valassis In-Store Solutions, Inc., Livonia, MI (US)

( * ) Notice: Subject to any disclaimer, the term of this patent is extended or adjusted under 35 U.S.C. 154(b) by 3426 days.

(21) Appl. No.: 10/746,177

(22) Filed: Dec. 26, 2003

(65) Prior Publication Data

US 2005/0177422 A1 Aug. 11, 2005

(51) Int. Cl.
*G06Q 30/00* (2012.01)

(52) U.S. Cl.
USPC ............ 705/14.1; 705/14.11; 705/14.24; 705/14.26; 705/14.38

(58) Field of Classification Search
USPC .................................................. 705/14
See application file for complete search history.

(56) References Cited

U.S. PATENT DOCUMENTS

| | | | |
|---|---|---|---|
| 3,711,683 A | 1/1973 | Hamisch, Sr. | |
| 3,757,037 A | 9/1973 | Bialek | |
| 3,994,089 A | 11/1976 | Schwartz | |
| 4,323,608 A | 4/1982 | Denny et al. | |
| 4,423,486 A | 12/1983 | Berner | |
| 4,457,539 A | 7/1984 | Hamisch, Jr. | |
| 4,598,780 A | 7/1986 | Iwasaki et al. | |
| 4,674,041 A | 6/1987 | Lemon et al. | |
| 4,723,212 A * | 2/1988 | Mindrum et al. | 705/14.26 |
| 4,821,186 A | 4/1989 | Munakata et al. | |
| 4,901,237 A | 2/1990 | Hikita et al. | |
| 4,901,457 A | 2/1990 | Chandler | |
| 4,910,672 A | 3/1990 | Off et al. | |
| 4,928,229 A | 5/1990 | Teraoka et al. | |
| 4,929,818 A | 5/1990 | Bradbury et al. | |
| 4,932,485 A | 6/1990 | Mori | |
| 5,083,638 A | 1/1992 | Schneider | |
| 5,172,936 A | 12/1992 | Sullivan et al. | |
| 5,173,851 A | 12/1992 | Off et al. | |
| 5,185,695 A | 2/1993 | Pruchnicki | |
| 5,200,889 A | 4/1993 | Mori | |
| 5,245,533 A * | 9/1993 | Marshall | 705/10 |
| 5,329,713 A | 7/1994 | Lundell | |
| 5,350,612 A | 9/1994 | Stern et al. | |
| RE34,915 E * | 4/1995 | Nichtberger et al. | 705/14.23 |
| 5,439,721 A | 8/1995 | Pedroli et al. | |
| 5,560,718 A | 10/1996 | Furuya | |
| 5,578,797 A | 11/1996 | Hewitt et al. | |
| 5,612,868 A | 3/1997 | Off et al. | |
| 5,642,485 A | 6/1997 | Deaton et al. | |
| 5,649,114 A | 7/1997 | Deaton et al. | |
| 5,758,328 A | 5/1998 | Giovannoli | |
| 5,774,868 A | 6/1998 | Cragun et al. | |

(Continued)

FOREIGN PATENT DOCUMENTS

| | | |
|---|---|---|
| EP | 0837411 A1 | 4/1998 |
| EP | 0853290 A2 | 7/1998 |

(Continued)

*Primary Examiner* — John G Weiss
*Assistant Examiner* — Vincent Cao
(74) *Attorney, Agent, or Firm* — Brooks Kushman P.C.

(57) ABSTRACT

A promotion management system identifies store-selected identifiers as necessary to implement a particular promotion across multiple store chains. An audit system compares number of promotion offers distributed to number of linking items sold.

20 Claims, 3 Drawing Sheets

(56) References Cited

U.S. PATENT DOCUMENTS

| | | | |
|---|---|---|---|
| 5,832,457 A | 11/1998 | O'Brien et al. | |
| 5,857,175 A | 1/1999 | Day et al. | |
| 5,859,414 A | 1/1999 | Grimes et al. | |
| 5,865,470 A | 2/1999 | Thompson | |
| 5,866,181 A | 2/1999 | Hill | |
| 5,887,271 A | 3/1999 | Powell | |
| 5,892,827 A | 4/1999 | Beach et al. | |
| 5,895,075 A | 4/1999 | Edwards | |
| 5,926,795 A | 7/1999 | Williams | |
| 5,943,654 A | 8/1999 | Goodwin, III et al. | |
| 5,956,877 A | 9/1999 | Raasch et al. | |
| 5,974,396 A | 10/1999 | Anderson et al. | |
| 5,974,399 A | 10/1999 | Giuliani et al. | |
| 6,009,411 A | 12/1999 | Kepecs | |
| 6,014,634 A | 1/2000 | Scroggie et al. | |
| 6,026,370 A | 2/2000 | Jermyn | |
| 6,026,373 A | 2/2000 | Goodwin, III | |
| 6,041,309 A | 3/2000 | Laor | |
| 6,042,149 A | 3/2000 | Roshkoff | |
| 6,047,263 A | 4/2000 | Goodwin, III | |
| 6,055,573 A | 4/2000 | Gardenswartz et al. | |
| 6,067,524 A | 5/2000 | Byerly et al. | |
| 6,076,069 A | 6/2000 | Laor | |
| 6,138,911 A | 10/2000 | Fredregill et al. | |
| 6,151,586 A | 11/2000 | Brown | |
| 6,151,587 A | 11/2000 | Matthias | |
| 6,226,098 B1 | 5/2001 | Kulakowski et al. | |
| 6,240,394 B1 | 5/2001 | Uecker et al. | |
| 6,278,979 B1 | 8/2001 | Williams | |
| 6,282,516 B1 | 8/2001 | Giuliani | |
| 6,304,849 B1 | 10/2001 | Uecker et al. | |
| 6,307,958 B1 | 10/2001 | Deaton et al. | |
| 6,321,210 B1 | 11/2001 | O'Brien et al. | |
| 6,334,108 B1 | 12/2001 | Deaton et al. | |
| 6,351,735 B1 | 2/2002 | Deaton et al. | |
| 7,366,682 B1 * | 4/2008 | Katiyar et al. | 705/14 |
| 2001/0018665 A1 | 8/2001 | Sullivan et al. | |
| 2001/0046064 A1 | 11/2001 | Kulakowski et al. | |
| 2002/0046107 A1 | 4/2002 | Marshall et al. | |
| 2002/0055875 A1 | 5/2002 | Schulze, Jr. et al. | |
| 2002/0077907 A1 * | 6/2002 | Ukai et al. | 705/14 |
| 2002/0116260 A1 * | 8/2002 | Szabo et al. | 705/14 |
| 2002/0116267 A1 | 8/2002 | Weisz et al. | |
| 2003/0195806 A1 * | 10/2003 | Willman et al. | 705/14 |
| 2003/0205412 A1 | 11/2003 | Hewitt et al. | |
| 2004/0204992 A1 * | 10/2004 | Doerwald et al. | 705/14 |
| 2005/0015300 A1 | 1/2005 | Smith et al. | |
| 2007/0084917 A1 | 4/2007 | Fajkowski | |

FOREIGN PATENT DOCUMENTS

| | | |
|---|---|---|
| EP | 1197892 A2 | 4/2002 |
| FR | 2741987 | 6/1997 |
| JP | 60193824 | 10/1985 |
| JP | 63144667 | 6/1988 |
| JP | 63178875 | 7/1988 |
| JP | 63191370 | 8/1988 |
| JP | 3138171 | 6/1991 |
| WO | WO 02/25553 A2 | 3/2002 |

* cited by examiner

COMPUTERIZED MANAGEMENT SYSTEM FOR MULTI-CHAIN PROMOTIONS, AND RELATED AUDIT SYSTEM

TECHNICAL FIELD

The present invention relates generally to systems utilized to set-up and manage promotions for multiple store chains, and more particularly, to systems utilized to set-up and manage promotions across multiple store chains where such promotions are linked to specific items.

BACKGROUND

As demonstrated by U.S. Pat. No. 5,578,797, it is known to provide food product scales capable of printing labels having a coupon part with a coupon bar code thereon. As demonstrated by European Patent Application No. EP 1,197,892 A2, control messages and information can be sent from remote locations to implement or adjust the coupon messages printed by any give scale in a store. As explained in co-pending application Ser. No. 10/423,471, filed Apr. 25, 2003, which application is assigned to the assignee of the present application, incentives can be printed on labels or paper tickets, and can also be communicated to store customers using displays.

Unfortunately, when it comes to perishable food products such as those commonly found in the deli, meat & fish or fruit & vegetable departments, different store chains can use different product identifiers for the same food products, making it difficult to easily manage and distribute similar promotions for different store chains. It would be desirable to have an effective, computerized system for managing coupons, incentives, advertisements and other promotions across multiple store chains. Because manufacturers are typically charged for each coupon or other promotion distributed, it would also be desirable to provide an audit function to assure manufacturers that they are only being billed for legitimate distribution of promotions.

SUMMARY

In one aspect, a promotion management system is provided for managing a promotion to be provided in at least one store of a first store chain and at least one store of a second store chain, where the promotion is for a promoted product and is to be implemented in the store of the first store chain and the store of the second store chain in relation with a promotion category. The system includes a computerized system operable to carry out the following steps in connection with the promotion: identify a first store selected identifier associated with a product that is sold by the store of the first store chain and that is in the promotion category; and identify a second store selected identifier associated with a product that is sold by the store of the second store chain and that is in the promotion category; wherein the first store selected identifier is different than the second store selected identifier.

In another aspect, a computerized promotion management system includes a database of store product information including a plurality of store selected identifiers associated with a respective plurality of products, the database also associating each of the plurality of products with one or more promotion categories. A promotion set-up unit accesses the database to identify one or more store selected identifiers associated with one or more respective products that are within a promotion category for a particular promotion being set-up.

In a further aspect, a computerized promotion management system includes an interface for receiving PLU number file data. A mapping unit examines a plurality of PLU number records in the PLU number file data and, for at least some of the PLU number records, matches the PLU number record to one or more specified promotion categories that apply to the product associated with the PLU number record. A database receives and stores mapped PLU number data.

In a further aspect, a method is provided for promotion monitoring in connection with the distribution of a particular promotion offer for a promoted product by one or more devices in a store in connection with one or more linking products. The method involves the steps of: tracking a number of promotion offers distributed by the one or more devices in the store; tracking a number of linking products that pass through a point-of-sale of the store; and comparing the tracked number of promotion offers with the tracked number of linking products.

DESCRIPTION

Figure 1:
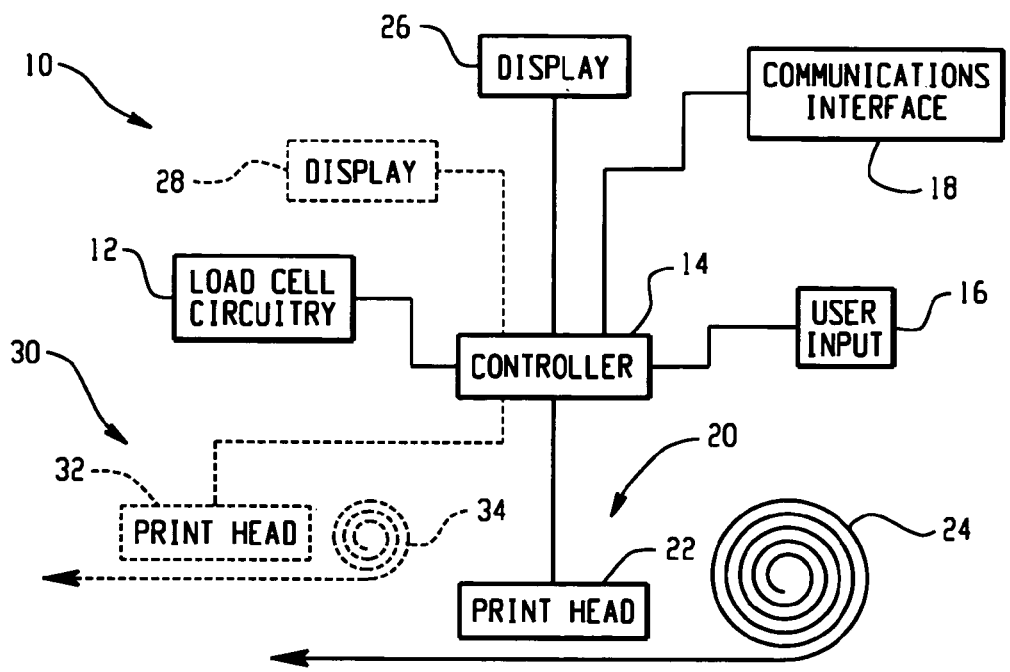
FIG. 1 is a schematic depiction of a food product scale.
Figure 2:
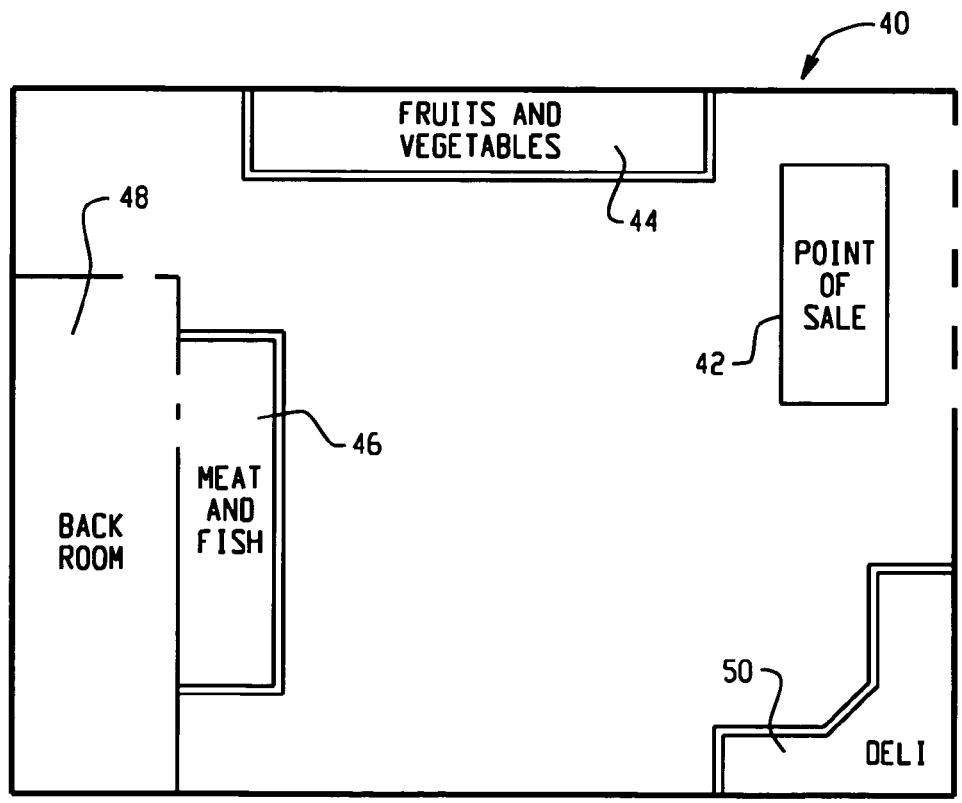
FIG. 2 is a plan view of an exemplary store.

Referring to FIGS. 1 and 2, a brief introduction providing a context for the promotion management system hereafter described is provided. As used herein, the term "promotion" is intended to broadly encompass coupons, other incentives, and even advertisements and marketing messages to be distributed to consumers. Each such distribution of a promotion is referred to herein as a "promotion offer." In one embodiment, the promotion management system is utilized to control the set up and distribution of promotions to be provided by food product scales in supermarkets and grocery stores. FIG. 1 schematically shows an exemplary food product scale 10 that includes an associated weighing station 12 having a load cell or other known weighing mechanism or device to produce weight indicative signals that are passed to a controller 14. A user input device 16 (such as a keypad, a touch sensitive display, a scanner, etc.) is also connected to the controller 14. The user input device 16 may be utilized by store personnel (or in the case of a self service situation the customer) to identify the product being weighed, usually by a PLU (price look-up) number. The controller 14 refers to a price database (stored in suitable memory of the controller or accessible via a link through communications interface 18 to another computer system) to identify the price per unit weight linked to the entered PLU or other product identifier, and calculates a total price for the product based upon the weight as indicated by the weight indicative signals received from the weighing station 12. The controller 14 then establishes product print data (such as total price, price per unit weight, product bar code, logos or other image data, label set-up and format) to be delivered to a printing mechanism 20. The printing mechanism 20 includes a print head 22 and associated supply of adhesive labels 24 to be applied to products once the product print data is printed on a label ("product label") and the product label is output. The print head may be a thermal print head, with the labels including a thermally activated layer. However, it is recognized that other print head types and corresponding label types could be used. The adhesive side of the labels may be entirely or partially coated with adhesive, and the labels may be formed of any suitable material. The scale also includes a display 26 for displaying information, such as weight and price of the item being weighed.

In another embodiment, the scale may also include another display 28, with display 26 set up to face an operator side of the scale and with the other display 28 set up to face a customer side of the scale. The inclusion of another printing mechanism 30 is also possible, with the printing mechanism 30 including an associated print head 32 and supply of media 34, which media 34 may be label media or non-label media.

Referring now to FIG. 2, the scale 10 may be located within a store 40 having a point of sale 42 with an associated computerized checkout system, typically including plurality of check out lanes, each with a corresponding bar code scanner, cash register and electronic payment terminal (as used for paying by credit card or debit card). The scale 10 is preferably located at another location, such as a perishables department as represented by the fruit and vegetable department 44, the meat and fish department 46 or associated back room 48, or the deli department 50 so that promotion offers can be provided to customers prior to the actual purchase of any products and prior to the customer being on the way out of the store.

Multiple scales 10 within a store 40 can be used to distribute promotion offers to customers for promoted products in relation to linking products. The term "linking product" is use herein to refer to a product that, when weighed by the scale, causes a promotion offer to be generated for a promoted product that is different that the linking product. Often times there will be some identifiable relationship between the linking product and the promoted product, such as two food products that are complimentary to each other. However, there is no requirement that the linking product and the promoted product have any identifiable relationship other than the promotion itself. In some promotion systems promotion offers may be generated by in-store devices other than scales. Accordingly, the term "linking product" encompasses products that when identified to such non-scale devices (as by scanning a product code or manual input of a product code) cause such non-scale devices to print, or otherwise communicate (e.g., as by a display) to a consumer, a promotion offer for a promoted product that is different than the linking product.

Typical product codes incorporated into the standard UPC-A bar code format are manufacturer selected and consistent across different stores and store chains into which the product is placed and sold. By contrast, PLU numbers are considered "store selected identifiers" because each store or store chain can select its own PLU numbering system for the majority of the perishable food items it offers. For example, for the purpose of weighing, pricing and check-out, the same brand of hard salami could be identified by one PLU number in one store chain and could be identified by a different PLU number in another store chain. While PLU numbers are discussed herein as the primary form of product identifier used by stores, it is recognized that other types of store selected identifiers are possible.

Promotion Set-Up and Distribution

Figures 3, 4:
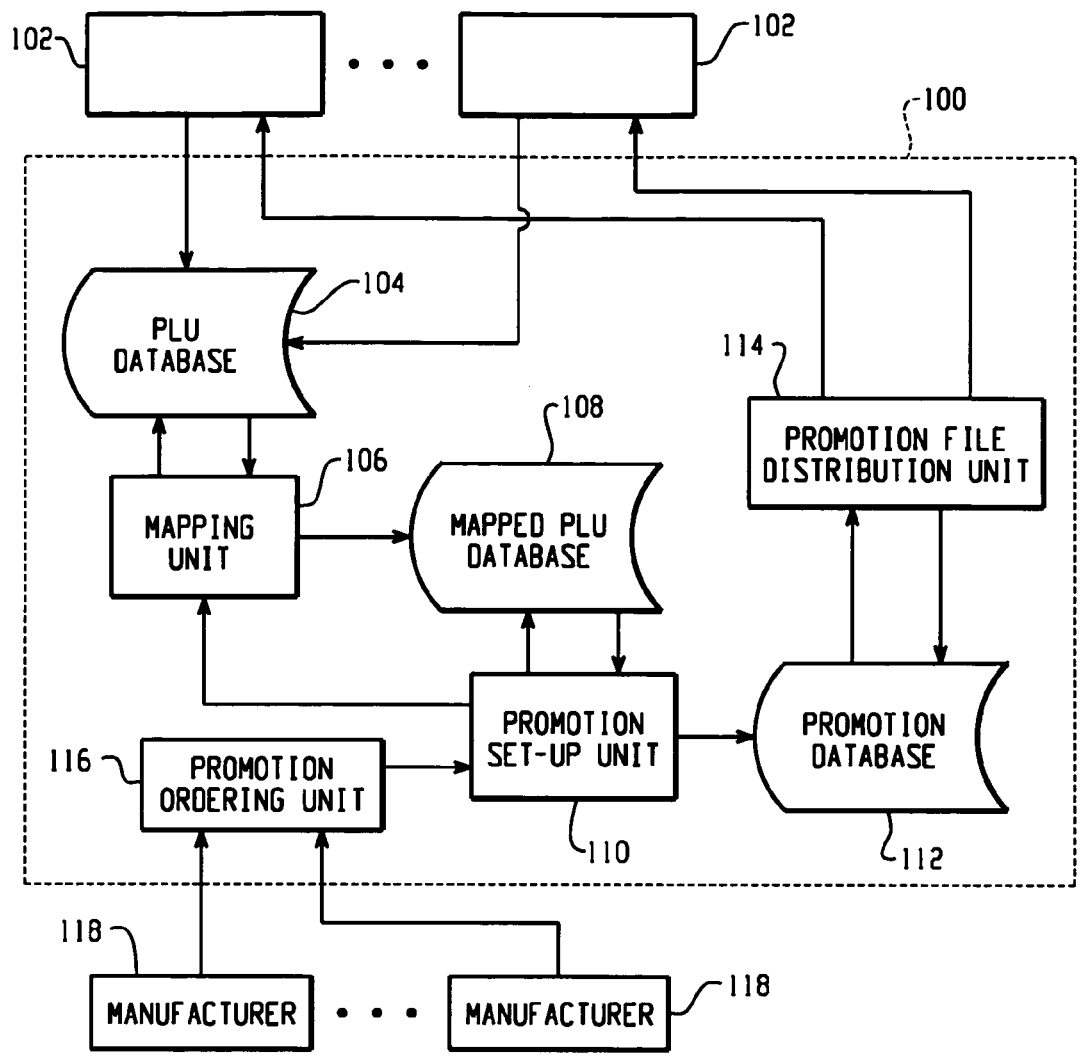
FIG. 3 depicts one embodiment of a promotion management system.
FIG. 4 represents a store PLU record file.

One embodiment of a computerized promotion management system 100 is shown in FIG. 3. Different retailers 102 communicate their PLU file data information to the promotion management system 100 where it is accumulated and stored in a database 104. A typical PLU data file provide by a store would include a record for each PLU number, along with sufficient information to identify the product and manufacturer or brand associated with the PLU number, as indicated by the exemplary PLU data file shown in FIG. 4. It is recognized that additional data could be provided in the PLU data file. It is also recognized that each retailer could provide more than one PLU data file to the promotion management system. For example, where different stores or regions of the retailer use different PLU numbering systems or simply offer a different selection of items under the same PLU numbering system, the retailer might provide a PLU data file for each store or each region. Of course, a single PLU data file could also be organized to provide the different information on a store-by-store or region-by-region basis.

Referring again to FIG. 3, a mapping unit 106 has access to the PLU database 104 and operates to match PLU numbers to different promotion categories. As used herein the term "promotion category" is intended to be broadly construed. By way of example, and not by way of limitation, a "promotion category" may be any one of (i) a brand-specific product, such as a particular brand of boiled ham, or a particular brand of baked ham, or a particular brand of hard salami etc., (ii) a brand-specific product type, such as all hams (baked, boiled, smoked etc.) of a particular brand, (iii) a brand-generic product, such as all brands of boiled ham, or all brands of baked ham, or all brands of hard salami etc., (iv) a brand-genetic product type, such as all brands of all hams (backed, boiled, smoke etc.), or (v) a brand per se (e.g., all meat, cheese or other products of a particular brand). Of course, other promotion categories could also be established. In any event, the mapping unit 106 matches the PLU numbers from the retailer PLU data files in the PLU database 104 to any applicable promotion categories that are being made available for promotion, and produces mapped PLU data files that are stored in a mapped PLU database 108. A mapped PLU data file for each retailer/store chain may be produced and may include a record for each PLU number of the store chain along with a flag for each promotion category (PC1, PC2 ... PCN), with the status of the flag identifying whether the product associated with the PLU number is in the promotion category. In the simple example of FIG. 5, a flag bit state of "1" indicates the product for the given PLU number is in the promotion category while a flag bit state of "0" indicates the product for the given PLU number is not in the promotion category. As indicated, certain products may fall within more than one promotion category, and some products may not fall within any promotion category. While not shown in FIG. 5, it is recognized that the mapped PLU data records in mapped PLU database 108 might also include some or all of the information included in the corresponding PLU records of the PLU database 104.

A promotion set-up unit 110 has access to the mapped PLU database and operates to created promotion records and files as necessary to institute various promotions. For example, where a promotion offer is to be provided for a promoted product (PP) when products of a certain promotion category (PC) are weighed in stores of a store chain (SC 1) and another store chain (SC2), the promotion set-up unit 110 accesses the mapped PLU database to identify both (i) each PLU number in the mapped PLU data file for store chain SC1 that is matched to the promotion category PC and (ii) each PLU number in the mapped PLU data file for store chain SC2 that is matched to the promotion category PC. If more than two store chains are included in the promotion, similar identifications are made for each additional store chain. Once all necessary identifications are made, the promotion set-up unit 110 produces promotion records and files that are stored in promotion database 112. An given promotion record will typically include the PLU number for the linking product, the UPC-A bar code number for the promoted product, verbiage identifying a promotion message, data identifying a promotion discount (e.g., cents off, percent off etc.) if applicable, data identifying the applicable dates for the promotion and/or other data to assist in carrying out the promotion. A promotion record file, containing multiple promotion records, may be established for each store chain or retailer, or multiple promotion record files may be provided for each store chain or retailer if necessary for different store chain regions or different store chain stores. As reflected in FIG. 3, the promotion set-up unit also communicates with the mapping unit 106 to provide the promotion categories to the mapping unit 106.

A promotion file distribution unit 114 has access to the promotion database and communicates the appropriate promotion record files to the appropriate stores or store chains. In some cases the promotion file distribution unit 114 may communicate directly with food product scales or other promotion generation devices within stores. It is also possible that in some implementations the promotion file distribution unit 114 may communicate directly with point of sale computer systems in stores.

A promotion ordering unit 116 may be provided, with product manufacturers 118 having access (e.g., via the Internet to a password protected web site) to the unit to view what promotion categories, times and dates are available and to input an order indicating a desire to provide one or more promotions for one or more available promotion categories.

The promotion management system 100 may be provided by a single computer system or may be distributed across multiple computer systems having appropriate communication links, which could be of any suitable nature including wireless, hard-wired etc., but may likely utilize Internet links and protocols. The system 100 includes suitable interfaces for communicating with store chain computer systems, store computers, in-store devices etc. as necessary.

Thus, the foregoing promotion management system facilitates the set-up and distribution of promotions across multiple store chains, even where promotion offers for promoted products are to be generated in connection with linking products and the different store chains utilize different PLU numbers for the same linking products.

Promotion Offer Billing and Auditing

Once promotions are established and communicated to the stores, promotion offers may be selectively communicated to consumers in relation to the promotion category. For example, where the promotion category is a generic product-type, such as all brands of all deli hams, each time a deli scale within a store running the promotion weighs a ham product, a promotion offer is provided to the consumer receiving the ham. By way of example and not by way of limitation, the promotion offer could be provided via (i) information printed on a label printed by the scale, (ii) a display associated with the scale, (iii) use of an RFID tag to which information is written or having an associated number that becomes linked to the promotion, or (iv) some combination of the foregoing.

Food product manufacturer's commonly have a set budget for coupons and other promotions, and therefore are drawn toward promotions that give them the most return on their investment. In the promotion system described above it is contemplated that manufacturers of promoted products will be charged a certain fee for each promotion offer distributed to a consumer. The fee may be the same as between different manners of providing the promotion offer to the consumer, or could vary. Regardless, it is anticipated that the promotion system can be made more attractive to manufacturers if they can be provided with some assurance that substantially all promotion offers distributed, and for which they pay, are legitimate. The following audit system is intended to provide that assurance.

Figures 5, 6:
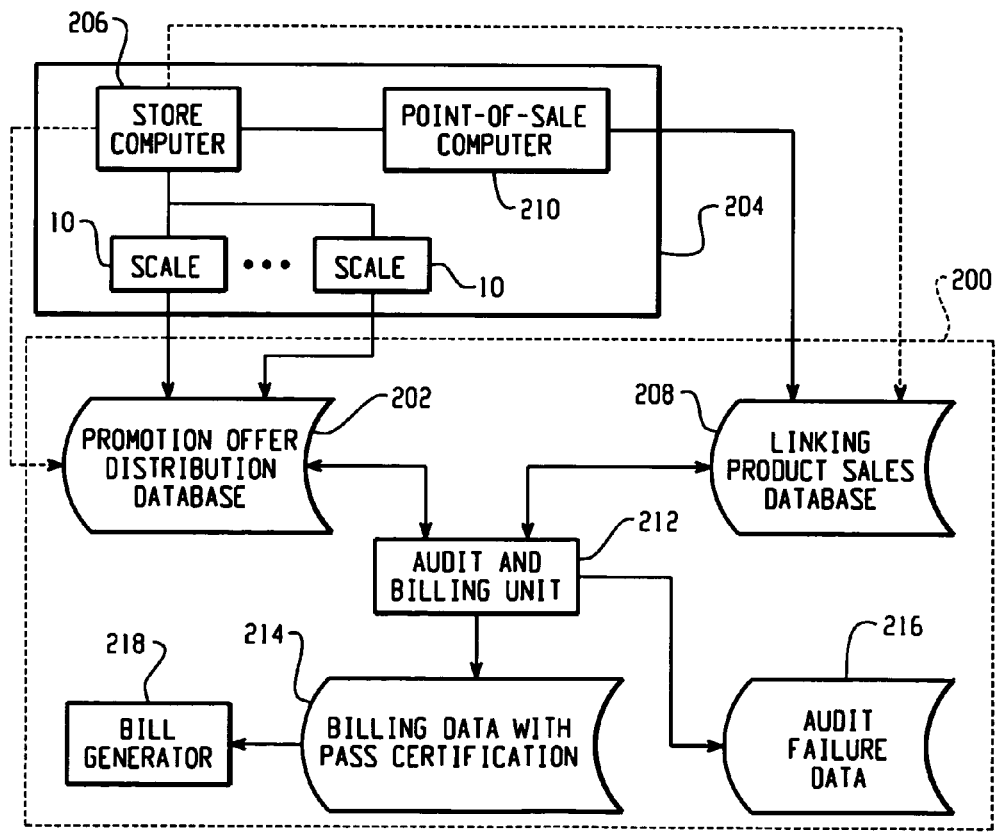
FIG. 5 represents mapped store PLU record files.
FIG. 6 depicts a promotion audit system.

Referring to FIG. 6, a promotion offer audit system 200 is provided. The system 200 includes a promotion offer distribution database 202 that receives and stores data regarding the number and type of promotion offers distributed by a store 204, as well as the date of distribution. Alternatively, where stores prefer not to provide data identifying the exact date of distribution of each promotion offer, all promotion offer data could be for a set, billing time period. In one example, the scale systems 10 may be configured to maintain a running count of each promotion offer distributed. In one embodiment the promotion offer distribution data is communicated directly from the promotion distributing scale systems 10 within the store to the system 200. In another embodiment the data is first communicated from the scale systems 10 to a store computer system 206, which in turn communicates the data to the system 200. It is also recognized that multiple stores could first communicate the promotion offer distribution data to a store chain computer system or regional computer system before the data is communicated on to the promotion offer audit system 200. Regardless of the manner in which the data is communicated, the information in database 202 can be used for billing manufacturers of promoted products. However, the information in database 202 is first compared with control or audit data. In this regard, system 202 includes a linking product sales database 208 that stores information concerning total sales of various linking products, as well as the dates of such sales. Alternatively, where stores prefer not to provide exact dates of sales, the sales data could be for the set, billing time period. The system 200 may receive the information for database 208 from a point-of-sale computer system 210 in the store, or the information may first be communicated to store computer system 206 or a store chain computer system prior to communication to the system 200. The point-of-sale computer system 210 or store computer system 206 may be configured to analyze sales data to accumulate or track sales of linking products.

Referring to the example mentioned above (i.e., where the promotion category is all brands of all deli hams), the deli hams represent the linking products that, when weighed, cause a promotion offer to be provided for a promoted product. For the sake of this example assume the promoted product is BrandX Mustard, in which case the deli hams can be referred to as BrandX Mustard Linking Products. In such case, database 202 includes information identifying the number of promotion offers distributed for BrandX Mustard during the billing time period, and database 204 includes information identifying the number of BrandX Mustard Linking Products that passed through the point-of-sale during the billing time period. Because each distribution of a promotion offer for BrandX Mustard should be accompanied by a customer receiving the BrandX Mustard Linking Product that was weighed, it is reasonable to expect that the number of promotion offers distributed for BrandX Mustard during the billing time period should fairly match the number of BrandX Mustard Linking Products that passed through the point-of-sale during the same billing time period. However, it is recognized that an exact match will not likely occur because of the human error factor. For example, errors occasionally occur during weighing of food products (e.g., errors that might cause an operator to weigh a food product twice in which a promotion offer might be "distributed" to a particular consumer twice even though only one linking product is given to the particular consumer). Similarly, consumers introduce errors when they receive a weighed food product and later decide not to purchase it, in which case the consumer often removes the product from their collection of food items and leaves it somewhere in the store. This consumer action is often referred to as a "set down." Optimum implementation of the audit system herein described will involve first examining or tracking historical data for set downs and operator errors in given stores. This historical data can then be incorporated into the functionality of the audit and billing unit 212 of system 200 as described below.

In particular, audit and billing unit 212 accesses and processes information from databases 202 and 208 during billing and auditing. The unit 212 compares the number of promotion offers distributed for BrandX Mustard during a billing time period with the number of BrandX Mustard Linking Products that passed through the point-of-sale during the same billing time period. Assume historical data indicates that the number of promotion offers distributed for BrandX Mustard should be no more than a certain amount greater than the number of BrandX Mustard Linking Products that pass through the point-of-sale. The unit 212 produces and stores in database 214 billing data with an audit certification if, in fact, the comparison indicates that the number of promotion offers distributed for BrandX Mustard is no more than the certain amount greater than the number of BrandX Mustard Linking Products that passed through the point-of-sale. However, if the comparison indicates that the number of promotion offers distributed for BrandX Mustard is more than the certain amount greater than the number of BrandX Mustard Linking Products that passed through the point-of-sale, the unit 212 produces and stores an audit failure indication, or potential audit failure indication, in database 216. In one implementation the audit and billing unit 212 does not generate billing data in such as case. However, in a more advanced implementation, the audit and billing unit 212 may simply automatically adjust the promotion offer billing data for the BrandX Mustard promotion to match or substantially match the number of BrandX Mustard Linking Products that passed through the point-of-sale. The generation of audit failure data or potential audit failure data may also be used to initiate a review of the cause of the discrepancy in an effort to correct any problem that might exist. For example, an audit error message could be communicated to the store 204, which would then be responsible for investigating the cause of the audit error. A billing generation unit 218 is also shown and can access database 214 to generate (e.g., print or electronically produce) a bill that can be forwarded to the BrandX manufacturer. The generated bill can include message data certifying that the bill has been audited and the audit passed.

While the foregoing assumes that a single promotion offer is provided in connection with a linking product, it is recognized that multiple promotion offers could be provided in connection with each linking product weighed, in which case the comparing step might involve first dividing the tracked number of promotion offers by 2 or 3 or 4 etc.

While the foregoing example suggests the use of historical data to identify the appropriate, permissible difference between the number of promotion offers distributed and number of linking products sold, it is recognized that such historical data need not be used. For example, a permissible difference could simply be assumed.

In another implementation, the audit billing unit 212 could be configured such that differences between the number of promotion offers distributed and number of linking products sold simply trigger the generation of billing data for a number of promotion offers that matches or substantially matches the number of linking products sold.

Moreover, while the above-described examples are discussed primarily with reference to variable promotions that are selected and delivered on the fly in the store, it is recognized that the subject audit system could be used in connection with any promotions distributed in connection with another product, including preprinted promotions as might be included on labels used in scales or other in-store printing devices. In such cases the 'another product' is considered a "promotion tied product" even though it may not be a "linking product." Further, the term "promotion tied product" is intended to encompass "linking products" as well.

While the foregoing example is made with respect to a single promotion, it is recognized that the same auditing functions would be taking place for each promotion in effect in a given store or store chain. Further, while the illustrated embodiment contemplates an audit system 200 remote from the stores 204, it is recognized that the audit function could be incorporated into each store computer system 206. Moreover, the audit function could be incorporated into a regional or nationwide computer system for a store chain. However, more likely than not the audit functionality of system 200 would be integrated with the computer system or systems making up the promotion management system 100 previously described with reference to FIG. 3.

It is recognized that numerous other variations exist, including both narrowing and broadening variations of the above-described embodiments and examples.

What is claimed is:

1. A method for promotion monitoring in connection with the distribution of a particular promotion offer for a promoted product by one or more devices in a store in connection with one or more linking products, the method comprising:
   tracking a number of the particular promotion offers distributed by the one or more devices in the store, wherein the particular promotion offer for the promoted product is generated in relation to the one or more linking products;
   tracking a number of the one or more linking products that pass through a point-of-sale of the store; and
   comparing, by one or more processors, the tracked number of the particular promotion offers with the tracked number of the one or more linking products.

2. The method of claim 1 further comprising:
   initiating an error indication when the tracked number of the particular promotion offers is greater than the tracked number of the one or more linking products by at least a certain amount.

3. The method of claim 2 further comprising:
   automatically adjusting billing data for the particular promotion offer to match the number of the one or more linking products.

4. The method of claim 2 wherein the certain amount is based on historical data for set downs and operator errors.

5. The method of claim 1 further comprising:
   generating billing data when the tracked number of the particular promotion offers is no more than a certain amount greater than the tracked number of the one or more linking products.

6. The method of claim 5 wherein the certain amount is based on historical data for set downs and operator errors.

7. The method of claim 5 further comprising:
   generating an audit certification with the billing data.

8. The method of claim 7 further comprising:
generating a bill based on the billing data, the bill including a message indicative of the audit certification.

9. The method of claim 1, wherein a plurality of particular promotion offers is provided in connection with the one or more linking products, the method further comprising:
dividing the tracked number of promotion offers by the plurality prior to comparing it to the tracked number of the one or more linking products that pass through a point-of-sale of the store.

10. A computerized system comprising:
one or more processors; and
a memory including instructions executable by the one or more processors, the instructions, when executed, implement the following steps:
tracking a number of the particular promotion offers distributed by the one or more devices in the store, wherein the particular promotion offer for the promoted product is generated in relation to the one or more linking products;
tracking a number of the one or more linking products that pass through a point-of-sale of the store; and
comparing, by one or more processors, the tracked number of the particular promotion offers with the tracked number of the one or more linking products.

11. The computerized system of claim 10, wherein the instructions, when executed, further implement the step of:
initiating an error indication when the tracked number of the particular promotion offers is greater than the tracked number of the one or more linking products by at least a certain amount.

12. The computerized system of claim 11, wherein the instructions, when executed, further implement the step of:
automatically adjusting billing data for the particular promotion offer to match the number of the one or more linking products.

13. The computerized system of claim 11, wherein the certain amount is based on historical data for set downs and operator errors.

14. The computerized system of claim 10, wherein the instructions, when executed, further implement the step of:
generating billing data when the tracked number of the particular promotion offers is no more than a certain amount greater than the tracked number of the one or more linking products.

15. The computerized system of claim 14, wherein the instructions, when executed, further implement the step of:
generating an audit certification with the billing data.

16. An audit system for promotion monitoring in connection with the distribution of a particular promotion offer for a promoted product by one or more devices in a store in connection with one or more linking products, the audit system comprising:
a promotion offer distribution database that stores data indicative of a number of the particular promotion offers distributed by the one or more devices in the store during a billing period, wherein the particular promotion offer for the promoted product is generated in relation to the one or more linking products;
a linking product sales database that stores data indicative of a number of the one or more linking products that pass through a point-of-sale of the store; and
an audit and billing unit in communication with the promotion offer distribution database and the linking product sales database, the audit and billing unit including one or more processors and one or more non-transitory memory devices for storing instructions that, when executed by the one or more processors, cause the audit and billing unit to compare the tracked number of the particular promotion offers with the tracked number of the one or more linking products.

17. The audit system of claim 16, wherein the audit and billing unit generates an error indication when the tracked number of the particular promotion offers is greater than the tracked number of the one or more linking products by at least a certain amount.

18. The audit system of claim 17, wherein the audit and billing unit automatically adjusts billing data for the particular promotion offer to match the number of the one or more linking products.

19. The audit system of claim 16, wherein the audit and billing unit generates billing data when the tracked number of the particular promotion offers is no more than a certain amount greater than the tracked number of the one or more linking products.

20. The audit system of claim 19, further comprising:
a billing generator that generates a bill based on the billing data, wherein the bill includes a message certifying that the billing data has been audited and the audit passed.

* * * * *